United States Patent
Zittel et al.

(10) Patent No.: US 11,928,630 B2
(45) Date of Patent: Mar. 12, 2024

(54) ISSUE TRACKING SYSTEMS AND METHODS

(71) Applicants: Atlassian Pty Ltd., Sydney (AU); Atlassian Inc., San Francisco, CA (US)

(72) Inventors: Jascha-Alexander Stephan Zittel, Sydney (AU); Amaresh Ray, Sydney (AU); Bradley Jay Schoone, Sydney (AU); Christopher Charles Mann, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/728,914

(22) Filed: Apr. 25, 2022

(65) Prior Publication Data

US 2022/0253762 A1 Aug. 11, 2022

Related U.S. Application Data

(63) Continuation of application No. 16/914,419, filed on Jun. 28, 2020, now Pat. No. 11,315,058.

(51) Int. Cl.
*G06Q 10/0633* (2023.01)
*G06Q 10/0631* (2023.01)
*G06Q 10/0635* (2023.01)

(52) U.S. Cl.
CPC ........... *G06Q 10/0633* (2013.01); *G06Q 10/06316* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 9,612,885 B1 * | 4/2017 | Kane | G06F 21/52 |
| 2011/0126111 A1 | 5/2011 | Gill et al. | |

(Continued)

FOREIGN PATENT DOCUMENTS

| | | | | |
|---|---|---|---|---|
| CA | 2539130 C | * | 9/2012 | G06F 8/20 |
| CA | 3072045 A1 | * | 2/2019 | A01B 3/02 |
| WO | WO-2019050966 A2 | * | 3/2019 | G01N 33/6818 |

OTHER PUBLICATIONS

Rohit, Shivaswamy, Abani Patra, and Vipin Chaudhary. "Integrating data and compute-intensive workflows for uncertainty quantification in large-scale simulation: application to model-based hazard analysis." International Journal of Computer Mathematics 91.4 (2014): 730-747. (Year: 2014).*

(Continued)

*Primary Examiner* — Thomas L Mansfield
(74) *Attorney, Agent, or Firm* — Brownstein Hyatt Farber Schreck, LLP

(57) ABSTRACT

Described herein is a computer-implemented method. The method comprises receiving an operation notification in respect of a gated operation from a change requesting system, determining an issue type associated with the gated operation, and creating an issue of the determined issue type. The method further comprises determining that the issue has transitioned state from a pending workflow state to a particular operation resolution workflow state and, in response, generating an operation resolution message which is communicated to the change requesting system.

20 Claims, 6 Drawing Sheets

(56) References Cited

U.S. PATENT DOCUMENTS

| | | |
|---|---|---|
| 2012/0216243 A1 | 8/2012 | Gill et al. |
| 2019/0146830 A1* | 5/2019 | Gerber .................. G06N 20/00 718/101 |
| 2021/0063410 A1 | 3/2021 | Wilcox et al. |

OTHER PUBLICATIONS

Wickboldt, Juliano Araujo, et al. "A framework for risk assessment based on analysis of historical information of workflow execution in IT systems." Computer Networks 55.13 (2011): 2954-2975. (Year: 2011).*

Ani, Uchenna P. Daniel, Hongmei He, and Ashutosh Tiwari. "Review of cybersecurity issues in industrial critical infrastructure: manufacturing in perspective." Journal of Cyber Security Technology 1.1 (2017): 32-74. (Year: 2017).*

Mahdi et al., "A new intrusion detection system based on gated recurrent unit (GRU) and genetic algorithm," International Conference on Security, Privacy and Anonymity in Computation, Communication and Storage. Springer, Cham, 2019.

Wu et al., "On an integrated RAM aware enterprise process control system." 2008 4th International Conference on Wireless Communications, Networking and Mobile Computing. IEEE, 2008.

* cited by examiner

ISSUE TRACKING SYSTEMS AND METHODS

CROSS-REFERENCE TO RELATED APPLICATION(S)

This application is a continuation patent application of U.S. patent application Ser. No. 16/914,419, filed Jun. 28, 2020 and titled "Issue Tracking Systems and Methods," the disclosure of which is hereby incorporated herein by reference in its entirety.

TECHNICAL FIELD

The present disclosure is generally directed to issue tracking systems and methods and more specifically directed to an interface between an issue tracking system and change request system or other external system.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Software development is a complex process which can involve the use of multiple different tools and systems. By way of example, a given software development project may involve an issue tracking system, a source code management system, a build system, a test system, a deployment system, and/or other systems.

Many operations performed during the software development process have the potential to disrupt—potentially to a catastrophic degree—ongoing development of a software product and/or a released/deployed version of a software product (in which case the disruption extends to end users of the product).

SUMMARY

The developments described in this section are known to the inventors. However, unless otherwise indicated, it should not be assumed that any Some example embodiments are directed to a computer-implemented method. The method includes various operations including, receiving an operation notification from a change requesting system. The operation notification may be in respect of a gated operation to be performed by the change requesting system. An issue type associated with the gated operation may be determined. The issue type may be associated with a workflow that includes at least one pending workflow state and at least one operation resolution workflow state. An issue of the determined issue type may be created. The method may also include determining that an issue resolution event has occurred in respect of the issue. The issue resolution event may be a state transition of the issue from a pending workflow state to a particular operation resolution workflow state. In response to determining that the issue resolution event has occurred, an operation resolution message may be generated. A nature of the operation resolution message may depend on the particular operation resolution workflow state. The operation resolution message may be communicated to the change requesting system.

Some example embodiments are directed to a computer processing system that includes: one or more processing units; a communication interface; and a non-transient computer-readable storage medium storing sequences of instructions, which when executed by the one or more processing units, cause the one or more processing units to perform various operations. The operations include receiving, via the communication interface, an operation notification from a change requesting system. The operation notification is in respect of a gated operation to be performed by the change requesting system. The operations also include determining an issue type associated with the gated operation. The issue type may be associated with a workflow that includes at least one pending workflow state and at least one operation resolution workflow state. The operations may also include creating an issue of the determined issue type and determining that an issue resolution event has occurred in respect of the issue. The issue resolution event may be a state transition of the issue from a pending issue workflow state to a particular operation resolution workflow state. In response to determining that the issue resolution event has occurred, an operation resolution message may be generated. A nature of the operation resolution message may depend on the particular operation resolution workflow state. The operation resolution message may be communicated to the change requesting system.

Figure 1:
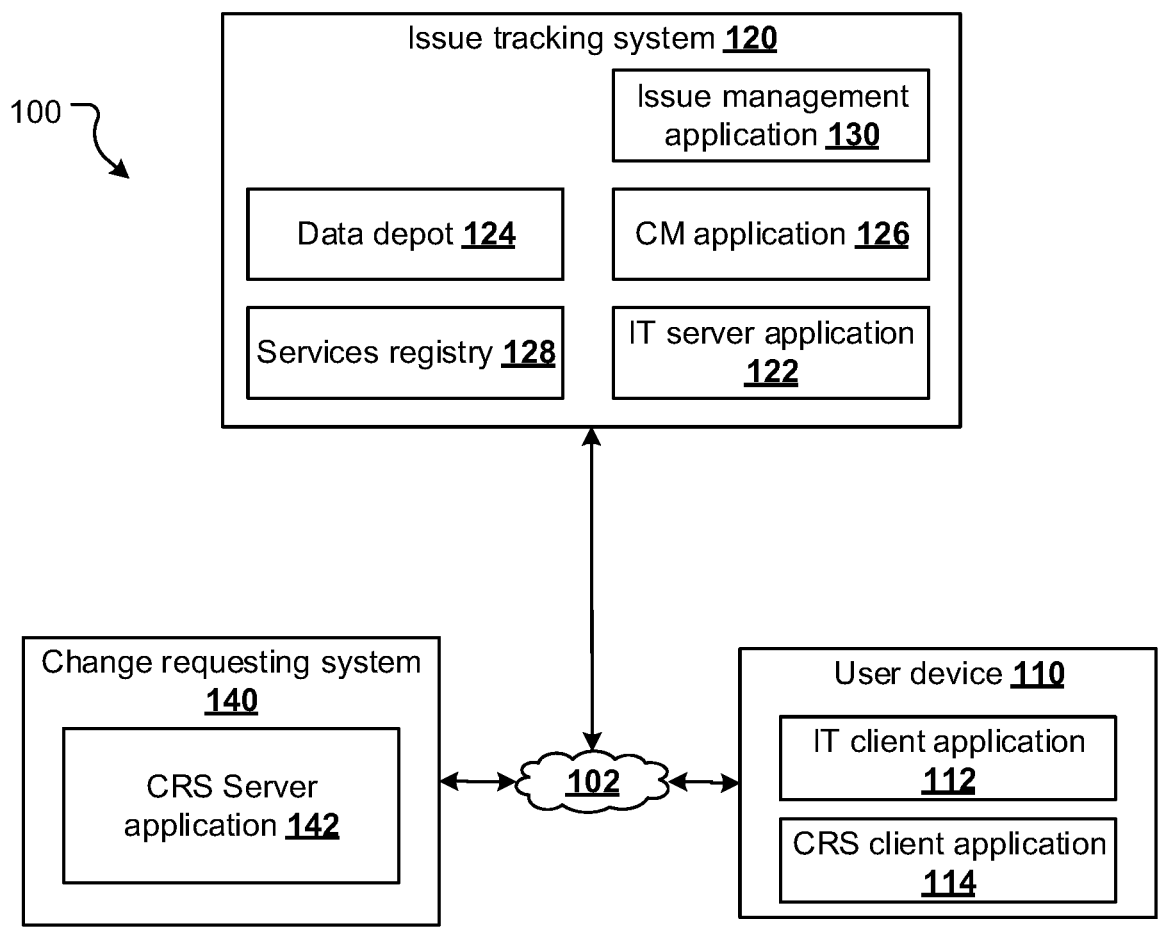
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, various software products/systems can be used to assist with developing and releasing software. These include, for example, issue tracking systems, source code management systems, continuous integration/deployment and other systems.

Very generally speaking, an issue tracking system such as Atlassian's Jira allows users to perform various actions with respect to the creation and management of issues. This includes, for example, defining issue types, issue workflows, creating projects, creating issues, associating issues with projects and/or other issues, transitioning issues between workflow states, editing information associated with issues, assigning issues to specific people/teams. An issue tracking system such as Jira also allow for certain operations to be automated. For example automation rules may be created which if triggered, cause certain operations to be performed. For example, an automation rule may be defined that causes a particular user (or user group) to be notified if an issue transitions from one particular state to another.

Use of an issue tracking system may involve creating a project corresponding to a software product (e.g. project A corresponds to software product A). Various aspects of the software development process for that product can then be tracked: for example a person who comes up with an idea for a new feature for software product A may create a 'new feature' issue (or set of related issues) for the feature and associate the issue with project A. As development of feature A progresses (e.g. planned, developed, built, tested, released), the feature A issue transitions through various workflow states with information being added to the issue by the relevant stakeholders.

The present disclosure relates to providing an issue tracking system that is configured to interact with other systems (referred to as change requesting systems herein) in order to facilitate change management with respect to operations performed by those other systems.

In present disclosure, a change requesting system is a system that performs one or more operations, the nature of the operations depending on the type of system it is. In the present disclosure, a change requesting system is configured to be able to flag certain operations it performs as gated operations. In the present context, a gated operation is one that triggers a change management process involving the issue tracking system and that cannot proceed unless/until the change management process results in approval of the operation.

Many use cases for this exist. To illustrate various features and techniques of the embodiments, a continuous integration/continuous development (CI/CD) system (such as Bitbucket Pipelines by Atlassian) will be used as an example change requesting system. A CI/CD systems perform various operations including, for example, building and deploying code. In the particular examples described, the CI/CD system is configured so that a deployment can be defined to be a gated operation. In this case, and as described in detail below, if a deployment pipeline reaches a point where code is to be deployed a check is performed to see whether that deployment is gated (in one example, the check being based on the particular code being deployed and the particular environment the code is being deployed to). If the deployment operation is gated, the change management process is triggered. In this case the, deployment operation is not performed until (and if) approval of the operation is received from the issue tracking system.

Initially, an overview of an example environment illustrating different systems involved in certain embodiments will be described, followed by a description of a computer system which can be configured in various ways to perform the embodiments/various features thereof as described herein. Following this, an example change management process will be described.

FIG. 1 illustrates an example environment 100 in which embodiments and features of the present disclosure are implemented. Example environment 100 includes a communications network 102 which interconnects a user device 110, an issue tracking system 120, and a change requesting system 140.

For ease of reference: the acronym ITS will be used herein in place of "issue tracking system": the acronym CRS will be used herein in place of "change requesting system"; and the acronym CM will be used herein in place of "change management".

User device 110 is a computer processing system with, in this example, an ITS client application 112 (ITS client for short) and a CRS client application 114 (CRS client 114 for short) installed thereon. User device 110 will also have other applications installed/running thereon, for example an operating system.

When executed by the user device 110 (e.g. by a processing unit such as 202 described below), the ITS client 112 configures the user device 110 to provide client-side ITS functionality. This involves communicating (using a communication interface such as 216 described below) with the ITS 120 (and, in particular, the ITS server application 122). ITS client 112 may be a dedicated application client that communicates with an ITS application server using an application programming interface (API). Alternatively, ITS client 112 may be a web browser (such as Chrome, Safari, Internet Explorer, Firefox, or an alternative we browser) which communicates with an ITS web server using http/https protocols.

When executed by the user device 110 (e.g. by a processing unit such as 202 described below), the CRS client 114 configures the user device 110 to provide client-side CRS functionality. This involves communicating with the CRS 140 (and, in particular, the CRS server 142). CRS client 114 may be a dedicated application client that communicates with a CRS application server using an API. Alternatively, CRS client 114 may be a web browser which communicates with an RS web server using http/https protocols.

In the present example, a single user device 110 has been shown with separate ITS and CRS clients 112 and 114. User device 110 may, however, be provided with a single application that can operate as both the ITS and CRS client applications (e.g. a web browser, in which case the corresponding ITS and CRS servers 122 and 142 are web servers).

Furthermore, while a single user device 110 has been depicted environment 100 will typically include multiple user devices, each configured to interact with the ITS 120 and/or the CRS 140. Accordingly, some user devices 110 may include both an ITS client 112 and CRS client 114, others may only include one of these.

User device 110 may be any form of computing device. Typically, user device 110 will be a personal computing device—e.g. a desktop computer, laptop computer, tablet computer, smart phone, or other computing device.

ITS 120 includes an ITS server application 122 (ITS server for short), a data depot 124, a change management application 126 (CM application 126 for short), a services registry 128, and an issue management application 130.

The ITS server 122 configures the ITS 120 to provide server side ITS functionality for end users—e.g. by receiving and responding to requests from ITS clients (e.g. ITS client 112). ITS server 122 may be a web server (for interacting with web browser clients) or an application server (for interacting with dedicated application clients). While ITS 120 has been illustrated with a single server 122 it may provide multiple servers (e.g. one or more web servers and/or one or more application servers).

The issue management application 130 performs various issue tracking system operations, some of which are mentioned herein (e.g. the creation and management of issue types, workflows, issues, automations, and other issue tracking system operations). As will be appreciated, therefore, the issue management application 130 may in fact be several interoperating applications running on one or more computer processing systems.

As described further below, the issue management application 130 also performs operations as part of a change management process.

The operations of (and functionality provided by) the data depot 124, the CM application 126, and the services registry 128 are described in further detail below.

In certain embodiments, ITS 120 is a scalable system. Depending on demand from clients (and/or other performance requirements), compute nodes can be provisioned/de-provisioned on demand. As an example, if there is high client demand additional ITS server applications 122 may be provisioned to cater for that demand. In this case, each functional component of the ITS 120 may involve one or several applications running on the same or separate computer systems, each application including one or more application programs, libraries, APIs or other software that implements the functionality described herein.

One example of an ITS 120 that can be configured to provide the functionality described herein is Jira.

In environment 100, CRS server system 140 is depicted as including a CRS server application 142 (CRS server for short). In this example, the CRS server 142 configures the CRS 140 to provide all 'normal' CRS functions and operations. As will be appreciated, therefore, CRS server 142 may well be several interoperating applications running on one or more computer processing systems.

The 'normal' functions and operations provided by CRS server 142 will depend on the type of system CRS 140 is. For example, in most cases the CRS server 142 will operate to provide one or more endpoints (e.g. a web server and/or application server) for CRS client applications such as 114. This allows a user of a user device 110 to interact with the CRS 140 to cause it to perform operations and to receive output of operations performed by the CRS 140.

Other functions and operations provided by the CRS server 142 will depend on the type of system the CRS 140 is. For example, where the CRS 140 is a CI/CD system, the CRS server 142 will perform operations such as retrieving source code from a code repository (which may be stored/managed by a separate source code repository system), building source code, and deploying built source code to various environments. Such operations can be defined as a pipeline which defines a set of specific build/deployment steps that are to be performed.

As described further below, in the embodiments described herein the CRS server 142 is further configured to perform certain change management functions (e.g. determine whether an operation is a gated operation and, if so, trigger a change management process and await an outcome of that process before actually performing the operation).

The CRS server 142 may include logic that causes it to provide the described change management functionality. Alternatively, the change management functionality described herein may be provided by an add-on or extension to an existing CRS server application 142 that does not natively include logic to provide such functionality.

One example of a CRS 140 that can be configured to provide the functionality described herein is a continuous integration/development (CI/CD) system such as Bitbucket by Atlassian.

Communications between the various systems in environment 100 are via the communications network 102. Communications network 102 may be a local area network, public network (e.g. the Internet), or a combination of both.

While environment 100 has been provided as an example, alternative system environments/architectures are possible.

The features and techniques described herein are implemented using one or more computer processing systems.

For example, in networked environment 100 described above, user device 110 is a computer processing system (for example, a personal computer, tablet/phone device, or other computer processing system). Similarly, the various functions performed by the ITS 120 and CRS 140 are performed by one or more computer processing systems (e.g. server computers or other computer processing systems).

Figure 2:
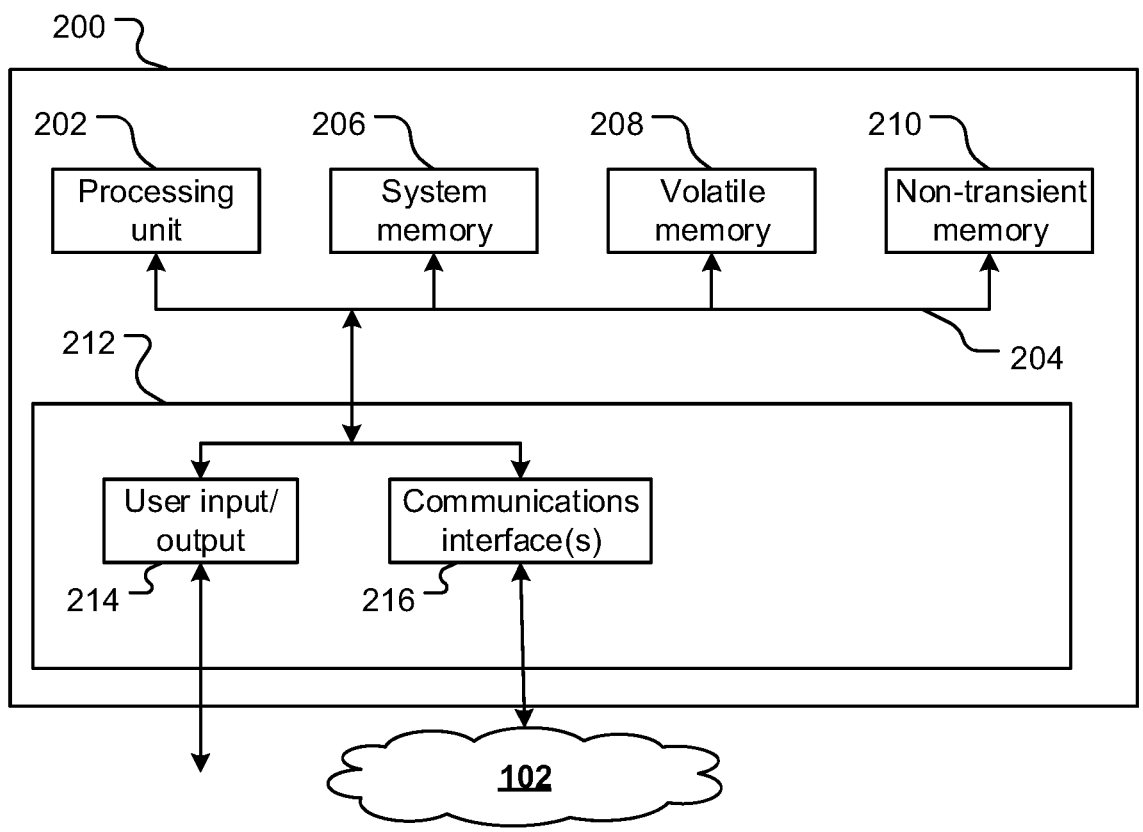
FIG. 2 is a block diagram of a computing system with which various embodiments of the present disclosure may be implemented.

FIG. 2 provides a block diagram of a computer processing system 200 configurable to perform various functions described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BRSS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; SS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 102 of environment 100 (and/or a local network within the ITS 120 or CRS 140). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Windows, macOS, iOS, Android, Unix, Linux, or other operating system.

System 200 also stores or has access to applications which, when executed by the processing unit 202, configure system 200 to perform various computer-implemented processing operations described herein. For example, and referring to the networked environment of FIG. 1 above: user device 110 includes an ITS client 112 and CRS client 114 which configure the user device 110 to perform various operations described herein.

The following provides a description of a change management process. In the present example, the change management process involves an issue generation process 300 (which will be described with reference to FIGS. 3 and 4) and an operation approval process 500 (which will be described with reference to FIGS. 5 and 6).

The issue generation process 300 and change approval process 500 as described below are generally divided into operations performed by the CRS 140 and operations performed by the ITS 120. Operations are further described as being performed by specific components or applications running on those systems. It should be appreciated, however, that although operations are described as being performed by particular applications, a given operation could, in many cases, be performed by an alternative application (or a group of applications). Generally speaking, therefore, where an operation is described as being performed by a particular component or application of the ITS 120, that operation could be more generally described as being performed by the ITS 120. Similarly, where an operation is described as being performed by the CRS server 142, that operation could be more generally described as being performed by the CRS 140.

Furthermore, where communication between applications is described, such communication may be direct or indirect. As one example, in process 300 the CRS server 142 is described as communicating a request to the services registry 128 of the ITS 120. Such a request may be made directly between the two applications (e.g. via an API call from the CRS server 142 to the services registry 128). Alternatively, such a request may be indirect—e.g. with the CRS server 142 making an API call to an alternative endpoint made available by the ITS 120, that endpoint receiving and passing the request (or an internal request that is generated based on the received request) to the services registry 128.

As noted, the embodiments will be described with reference to an environment in which the CRS 140 is a CI/CD system. The principles and features described, however, may be applied to different types of change requesting systems.

In order to perform the change management process described below initial configuration of the ITS 120 and CRS 140 is performed.

Configuration of the ITS 120 includes defining one or more issue types. An issue type is associated with particular data fields—i.e. data fields that can (or must) be populated when an issue of that type is created. An issue type is also associated with a workflow (discussed further below).

In the present disclosure, at least one change management (CM) issue type is defined that will, in due course, be used to create issues associated with an operation being performed by the CRS 140. Multiple CM issue types may be defined, for example different CM issue types for different operations that are performed by change requesting systems. The data fields for a particular issue type will be defined as appropriate for the operation that the issue type will ultimately be associated with. For example, the data fields defined for a 'deploy to production' issue type (which is to be used for a deploy to production environment operation) may differ from the data fields defined for a 'deploy to user testing' issue type.

Configuration of the ITS 120 also includes defining one or more workflows. A workflow is associated with an issue type and defines possible state and state transitions for issues of that type. A workflow may additionally define which user roles (or specific users) have permission to perform a particular state transition and any conditions that must be met in order to a transition to be possible. As an example, a simple workflow may have three states: 'pending', 'approved', 'rejected' and permissible state transitions of 'pending' to 'approved' and 'pending to 'rejected'. More complex workflows can be defined.

Once again, the particulars (states and state transitions) of a workflow will depend on the on the issue type the workflow is created for. Furthermore, a workflow may define various paths (e.g. states and transitions therebetween) that can be taken depending on a risk that is determined to be associated with an operation. To provide an example of this, a workflow associated with a particular CM issue type (the particular CM issue type created to cater for a particular operation performed by a CRS 140) may define four states: pending, under review, approved, rejected. The workflow may also define permissible state transitions of 'pending'→'approved', 'pending'→'under review', 'under review'→'approved', and 'under review'→'rejected'. In this case, and as described further below, if an issue of the particular issue type is determined to be in respect of a low risk operation, an automation rule may operate to automatically transition the issue directly from its initial pending state to the approved state. Alternatively, if an issue of the particular issue type is determined to be in respect of a high risk operation, an automation rule may operate to automatically transition the issue from its initial pending state to the 'to approve' state (at which point it may be approved and transition to the approved state, or rejected and transition to the rejected state.

Configuration of the ITS 120 may also include defining one or more automation rules. Generally speaking, a given automation rule defines a trigger (i.e. an event that causes the rule to run), a set of zero or more conditions (which are evaluated when the rule is run), and a set of one or more actions (which may be performed when the requisite conditions are satisfied).

By way of example, an automation rule may define that if an issue of a defined type is created (the trigger) that issue is automatically transitioned from its initial (pending) state to an approved state (the action). This is an example of a workflow without any conditions (and may be appropriate for issues relating to very low risk operations).

As another example, an automation rule may define that if an issue of a defined type is created (the trigger) and a risk associated with the issue is low (a condition) that issue is automatically transitioned from its initial (pending) state to an approved state (the action).

As another example, an automation rule may define that if an issue of a defined type is created (the trigger) and the issue has a completion time within the next 4 hours (a condition, in this case based on the value of a 'completion time' field of the issue and a current time), that issue is automatically transitioned from its initial state to an 'under review' state (a first action) and an instant message is communicated to a designated user requesting approval (a second action).

As will be appreciated, alternative (and more complex) automation rules may be defined to facilitate handling of an issue and its progress through a workflow. A given automation rule may define any combination of trigger, condition(s), and action(s). The present disclosure provides specific examples of: issue creation and state transitions as trigger events; conditions that are associated with risk; and actions that involve state transitions. Additional and/or alternative trigger events, conditions (or parameters/data on which conditions are based), and actions are possible.

Issue types, workflows, and/or automation rules may be manually created by users of the ITS 120 (e.g. by interaction with a user interface provided on a user's device 110 by the IT client 112). In addition, or alternatively, the ITS 120 may be configured to provide one or more default or template issue types/workflows/automation rules that can be used in that default form or modified to create new issue types/workflows/automation rules.

For certain CM issue types, namely those that are to be used to change manage operations being performed by the CRS 140, configuration of the ITS also includes associating workflow states with an operation status (i.e. an operation approved or operation rejected status). A workflow state that is associated with an operation status will be referred to as an operation resolution workflow state. As described below, issue state/operation status associations are used by the CM application 126 to determine whether a particular issue (or, in particular, an operation represented by a particular issue) has been approved or not.

In the present embodiments, the association of a workflow state with an operation status is project specific. In other words, while a particular workflow state may be associated with an operation approved status in one project, that same state need not be associated with an operation approved status for other projects. Project/workflow state/operation status associations may be stored in an operation resolution states data structure that is accessible to the change management application 126. For example:

| Project Identifier | Issue type identifier | Operation approved state(s) | Operation rejected state(s) |
|---|---|---|---|
| P1 | 001 | [approved] | [ ] |
| P1 | 002 | [approved, monitor deployment] | [terminate process, rejected, dormant] |
| P2 | 002 | [approved] | [rejected] |
| ... | ... | ... | ... |

In this example, for project P1: issue type 001 has a single workflow state that indicates an operation defined by an issue of that type is approved—the 'approved' workflow state; issue type 001 does not have any workflow states that indicate an operation defined by an issue of that type is rejected; issue type 002 has a two workflow states that indicate an operation defined by an issue of that type is approved—the 'approved' workflow state and a 'monitor deployment' workflow state; issue type 002 has three workflow states that indicate an operation defined by an issue of that type is rejected—the 'terminate process', 'rejected', and 'dormant' workflow states. Issue type 002 is also associated with project P2, however for project P2: only the 'approved' workflow state of issue type 002 is associated with an operation approved status (i.e. unlike project P1, for project P2 the 'monitor deployment' state is not associated with operation approval); only the 'rejected' workflow state of issue type 002 is associated with an operation rejected status.

As will be appreciated, providing a mapping of workflow states to an operation statuses allows the ITS 120 to determine resolution (approval or rejection) of an operation associated with an issue in a way that is separated from an issue's workflow. For example, for example, for issue type 002 above the workflow may well include additional states that the issue can transition through after (for example) transitioning to the 'approved' workflow state. In this case, transition to the 'approved' workflow state triggers approval of the operation back to the CRS 140 (and effectively ends the change management process). Transition to the 'approved' workflow state does not, however, end overall processing of the issue, which can then proceed to transition through other states (manually or automatically) and/or trigger additional automations. Furthermore, by making workflow state/operation status associations project specific a great deal of configuration flexibility is provided: even if a particular workflow state is an appropriate operation resolution workflow state for one project it may necessarily be so for another project.

In alternative implementations, however, the association of a workflow state with an operation status may be universal (i.e. apply to all projects).

Configuration of the ITS 120 also includes defining a project. In this disclosure a project is a collection of issues relate to a particular project. As an example, a project may be created to track all issues that relate to the development of a particular software product. A project has certain data associated with it—for example a project identifier, a project name, available issue types, automations, and/or other project data/details.

A project can have an association with a service (as described below). In the present embodiments, a project may be associated with multiple services, however a given service only has a change management type association with a single project (other association types with other projects being possible).

Configuration of the ITS also includes defining a service.

A service may have a service criticality measure (e.g. a service tier). The service criticality measure may, for example, be a value of between 1 (highly critical) to 4 (not critical)—though any appropriate measure may be used.

Service dependency relationships may also be defined—e.g. whether a given service depends on another service (i.e. the given service requires that other service to function, referred to as a 'requires' relationship) or is depended upon by another service (i.e. the other service requires the given service to function, referred to as a 'required by' relationship). A given service may form part of multiple 'required by' and/or multiple 'requires' dependency relationships, the other services in those relationships also having service criticality measures.

A service can also be associated with one or more CRS identifiers. A CRS identifier is an identifier of a particular asset maintained by, function performed by, or other facet of a CRS 140.

In the example below, where the CRS 140 is a CI/CD system, the CRS identifier is a pipeline identifier: i.e. an identifier of a pipeline that defines build and/or deployment steps to be performed by the CI/CD system on a given code base.

In the present example, the associations described above are stored in the services registry 128. The associations may be stored in any appropriate way, for example via relational database tables. For example, the association of a service with a criticality measure (e.g. a serve tier) and zero or more 'required' services (i.e. zero or more services the service in question requires to operate) may be stored in services table such as:

| Service identifier | Service tier | Required services |
|---|---|---|
| 001 | 4 | [ ] |
| 002 | 4 | [3] |
| 003 | 1 | [1, 4] |
| 004 | 3 | [ ] |

In this example, service 001 does not require any other services. Service 003, requires services 1 and 4 to operate. Although service 001 is itself only a tier 4 service (low criticality), its requirement by service 003 (tier 1, high criticality) means that if service 001 is interrupted it may have significant consequences (in that service 001 interruption may cause an interruption to service 003).

The association of a CRS identifier (e.g. pipeline identifier) with a service may be stored in a CRS table such as:

| Service identifier | CRS identifier |
|---|---|
| 001 | AAA |

In this example, service 001 is associated with CRS identifier (e.g. pipeline identifier) AAA.

The association of a service identifier with a project (and the type of that association) may be stored in a projects table such as:

| Service identifier | Project identifier | Association type |
|---|---|---|
| 001 | P5 | CM |

In this example, service 001 has a CM-type association with project P5.

Configuration of the CRS 140 includes creating operation gates. Generally speaking this involves flagging certain operations that may be performed by the CRS 140 as gated operations—i.e. operations that require approval. As described below, when the CRS 140 encounters a gated operation it does not perform the operation until, and if, an operation approval is received from the ITS 120.

The manner in which operation gates are created will depend on the particular type of operation in question. Generally speaking, however, an operation gate may be created by storing one more conditions in an operation gates data structure (which is stored in a CRS data store, not shown).

By way of example, where the CRS 140 is a CI/CD system, code deployment may be a gated operation. In this case, a given operation gate may be associated with a pipeline identifier (identifying the particular pipeline that includes the gated operation) and an environment identifier (identifying the particular environment being deployed to). In this case, and by way of example, the operation gates data structure may be a table such as:

| Pipeline identifier | Environment |
|---|---|
| 12345 | Testing |
| 12345 | Staging |
| 12345 | Production |
| 12400 | Production |

In this example, deployment to any of the testing, staging, or production environment in pipeline 12345 is a gated operation. In pipeline 12400, deployment to the production environment is a gated operation (however in that pipeline deployment of that repository to the testing or staging environment are not gated operations).

Figure 3:
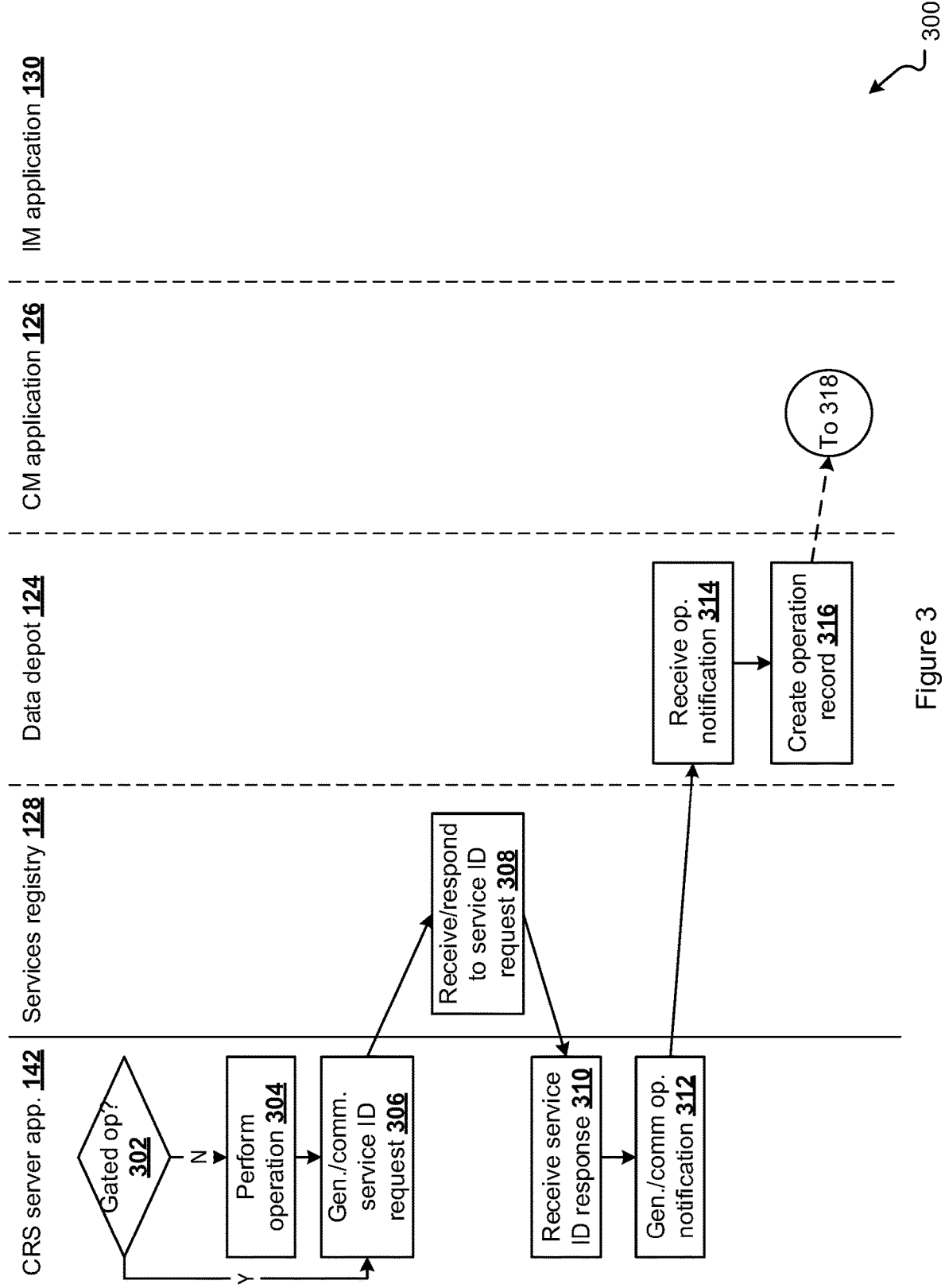
FIGS. 3 and 4 provide a flowchart indicating operations performed to automatically generate an issue relating to an operation to be performed by a change requesting system.
Figure 4:
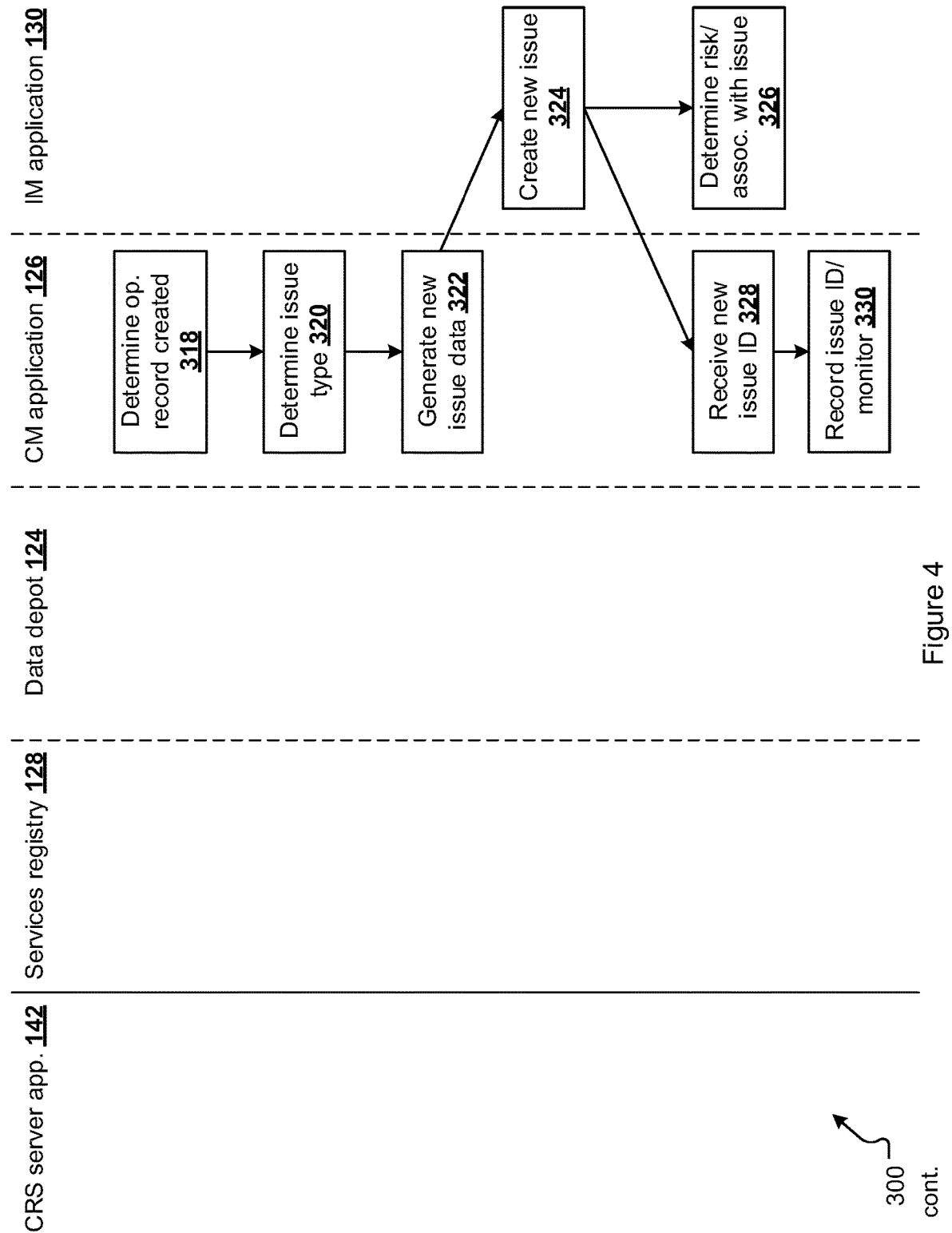

Turning to FIGS. 3 and 4, an issue generation process 300 will be described.

At 302, the CRS server 142 determines whether an operation that is about to be performed by the CRS 140 is a gated operation. The operation could be any operation performed by the CRS 140. The operation may be triggered by user interaction with a user interface provided on the user device 110 by CRS client 114 (in communication with the CRS server 142). Alternatively, the operation may be triggered automatically (e.g. as part of a CI/CD pipeline that is running where the CRS 140 is a CI/CD system).

Determination that an operation to be performed is a gated operation can be performed in various ways. For example, prior to performing an operation the CRS server 142 may query an operation gates data structure as described above.

As noted above, where the CRS 140 is a CI/CD system, deployment operations (i.e. operations involving deploying code from a particular repository to a particular environment) are examples of operations that may be gated. In this case, the operation gating data structure may be queried to determine whether an operation involving deployment of particular code (identified by a pipeline ID) to a particular environment is a gated operation.

If, at 302, the operation is determined not to be a gated operation, processing proceeds to 304. At 304, the operation is performed by the CRS server 142 as normal. In certain embodiments, process 300 then ends. In other embodiments, processing continues to 306 even for ungated operations. As will be seen below, this allows an ITS issue to be created in respect of the operation (in this case the issue being created to record that the operation has been performed rather than to ultimately approve or reject performance of the operation).

If, at 302, an operation is determined to be a gated operation, processing proceeds to 306. In this case the operation is not immediately performed by the CRS server 142 (and may never be performed if approval is not received from the ITS 120).

At 306, the CRS server 142 generates a service identifier request and communicates this to the ITS services registry 128. The service identifier request includes a CRS identifier. In the present example, the CRS identifier is the pipeline ID of the pipeline including the operation in question. The CRS server 142 may communicate the service identifier request to the services registry 128 (either directly or indirectly) via an API call.

At 308, the services registry 128 receives the service identifier request, processes the request, and communicates a service identifier response to the CRS server 142 (e.g. via an API response or other mechanism). In the present example, service identifier response includes the service identifier of the service that is associated with the CRS identifier (e.g. the pipeline identifier) that is received in the request. The service identifier can be identified, for example, by looking up a CRS table as described above.

At 310, the CRS server 142 receives the service identifier response generated by the services registry 128.

At 312, the CRS server 142 generates an operation notification and communicates this to the data depot 124 (directly or indirectly, for example via an API call or other mechanism).

In the present example, where the operation is deploying code to an environment, the operation notification may include the pipeline identifier, an operation identifier (indicating, for example, that the operation is a deployment operation), an environment identifier identifying the environment the code is being deployed to (e.g. deployment, testing, staging, production, or an alternative environment), and the service identifier received in the service identifier response. In the present embodiment, the operation notification also includes data indicating whether the operation in question is a gated operation or not.

At 314, the data depot 124 receives the operation notification generated by the CRS server 142.

At 316, the data depot 124 causes an operation record to be created and stored. The operation record includes data from (and/or derived from) the operation notification.

At 318 (FIG. 4), the CM application 126 determines that an operation record has been created by the data depot 124. This determination may be made in various ways. In certain embodiments, after data depot 124 has created the operation record it publishes an event indicating that a new operation record has been created on a publication/subscription service (not shown) to which the CM application 126 subscribes. In this case, the CM application 126 will determine that the operation record has been created via the publication/subscription service. Alternatively, the CM application 126 may determine an operation record has been created by periodically querying the data depot 124 for data on any new operation records. Further alternatively, the data depot 124 may be configured to notify the CM application 126 directly when a new operation record is created.

At 320, in response to determining an operation record has been created, the CM application 126 determines a CM issue type. The CM application 126 determines the type of issue using information in (or associated with) the service and/or from the change operation. Initially, a project that the operation record is associated with is identified. In the present example, determination of a project can be done by querying the services registry (e.g. a projects table) using the service identifier. As described above, a given service identifier will have a change management type association with a single project, that project being the project the operation record is associated with.

Once the project has been identified, a particular issue type that is associated with that project is determined. This determination may be made, for example, based on the type of operation defined by the operation record, whether the operation is a gated operation, and/or other parameters.

As noted above, in certain implementations the operation notification (and operation record) includes data indicating whether the operation in question is a gated operation or not. In this case the operation being gated or not may also be used to determine the CM issue type at 320 (and, accordingly, the workflow that is to be associated with that issue when created). Where the operation is a gated operation, the issue type determined at 320 will be associated with a workflow which has one or more operation resolution workflow states—i.e. one or more workflow states that is/are associated with an operation approved status or an operation rejected status.

At 322, the CM application 126 generates issue data for a new issue of the type determined at 320 (the issue type defining the available/required data fields for the issue). The CM application 126 may generate the new issue data based on data included in the operation record created at 316 and/or data associated with the project related to that record. In the present example, the issue data may include the CRS identifier (e.g. the pipeline identifier), an identifier of the operation in question (e.g. that it is a deployment operation), an identifier of the environment to which the deployment operation relates, the service identifier, the project identifier, and a flag indicating whether the operation is a gated operation or not.

At 324, a new issue in respect of the operation defined by the operation record is created by the issue management application 130. The type of the issue created is the issue type determined at 320. In the present example, creation of the new issue is caused by the CM application 126. Causing an issue to be created may be achieved in various ways, for example by an issue creation API call or other command. The new issue is created to include the issue data generated at 322, and is associated with the project in question (i.e. the project the service is associated with).

Creation of the issue involves the issue management application 130 generating a unique identifier for the issue, which is returned to the CM application 126.

At 326, the IM application 130 determines a risk associated with the operation in question.

In the present example, the IM application 130 determines risk with reference to service criticality data retrieved from the services registry 128. The service criticality data may be data in respect of the criticality of the service (e.g. the service tier) associated with the issue itself. The service criticality data may also include the criticality of any related services (i.e. any services that the service in question is in a 'required by' or 'requires' relationship with).

As an example, a service that is a (or in a relationship with any) high priority service (e.g. a criticality/tier 1 service) will generally result in a higher risk being determined than a service that is a (and is only in relationships with) low priority services (e.g. a criticality/tier 4 services).

The IM application 130 may also determine risk with reference to other predetermined parameters. For example, in the CI/CD example different environments may be associated with different risks—e.g. deployment of code to a testing environment may be associated with a lower risk than deployment to a production environment.

Additional and/or alternative parameters can also be used to determine risk.

By way of example, risk may be determined by reference to a risk matrix maintained by the ITS 120 and accessible to the IM application 130. An example of a two dimensional risk matrix for a deployment operation is as follows:

|  | Service tier 1 | Service tier 2 | Service tier 3 | Service tier 4 |
| --- | --- | --- | --- | --- |
| Testing | Medium | Medium | Low | Low |
| Staging | High | High | Medium | Medium |
| Production | Very high | Very high | High | High |

In this example, deployment to a production environment where the highest service tier (i.e. the highest service tier out of the actual service and any related services) is 1 is associated with a very high risk, while deployment to a testing environment where the highest service tier is 4 is associated with a low risk. A matrix such as this may be created with additional/alternative dimensions (i.e. parameters) and additional/alternative associated risks (e.g. a more or less granular risk assessment than the 'very high, high, medium, low' of the example).

Alternative risk assessment determinations are also possible, for example rule/Boolean logic based risk determinations based (again) on parameters such as operation type, service tier, deployment environment, and or/other parameters. Once the risk has been determined it is associated with the issue created at 324. Association of a risk with an issue can be achieved in various ways. For example, the risk may be written to a 'risk' (or other appropriate) field defined by the issue's type. Alternatively, a data structure associating issue identifiers with their determined risks may be stored (e.g. [issue ID, risk]). Alternative association mechanisms are possible.

In certain embodiments, risk determination may be performed (or triggered) by an automation rule—e.g. a rule having a trigger that an issue of a certain type is created (e.g. any change management issue type), no conditions, and actions which are to determine risk and associate the determined risk with the issue. Risk determination can, however, be performed in alternative ways. As one example, the CM application 126 could be configured to determine risk whilst generating new issue data (at 322) and then include the risk when the issue is created (at 324).

At 328, the CM application receives the issue identifier in respect of the issue created at 324.

At 330, if the operation record that caused creation of the new issue was in respect of a gated operation, the CM application 126 stores the issue identifier and initializes a monitoring process to monitor for event changes that occur with respect to that issue. In certain embodiments, the monitoring process involves subscribing to a publication/subscription service to which issue events are published by the issue management application 130 (however alternative monitoring mechanisms are possible). This is described further below, however generally speaking allows the CM application to determine whether the operation that the issue relates to is approved or rejected.

In implementations where the operation record includes data indicating whether the operation in question is a gated operation or not, the CM application 126 will only store the issue identifier/initialize a monitoring process if the operation record defines a gated operation. If the operation is not gated there is no need for the CM application 126 to take any further action or, therefore, store the issue identifier/monitor its progress.

Figure 5:
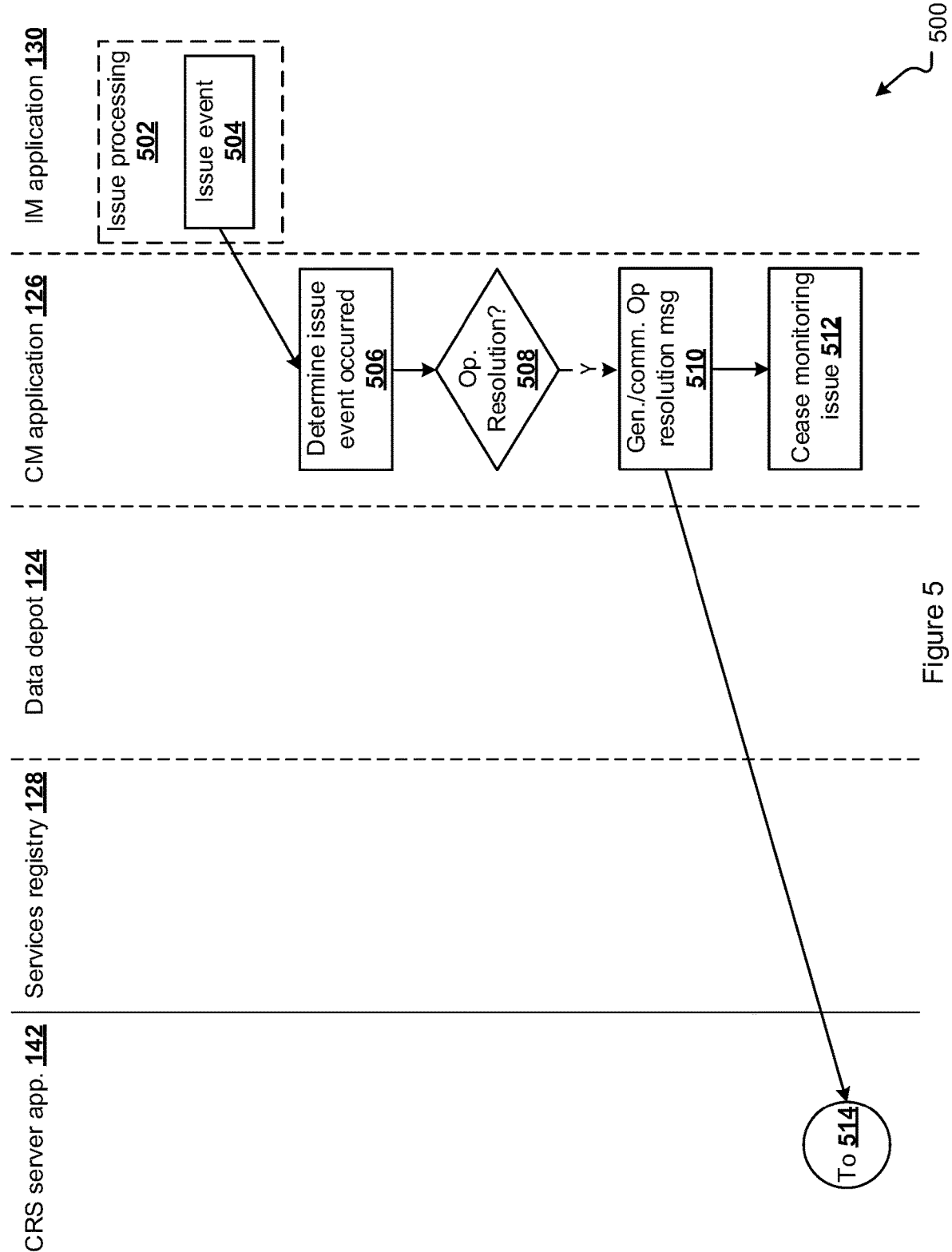
FIGS. 5 and 6 provide a flowchart indicating operations performed to approve or reject an operation to be performed by a change requesting system.
Figure 6:
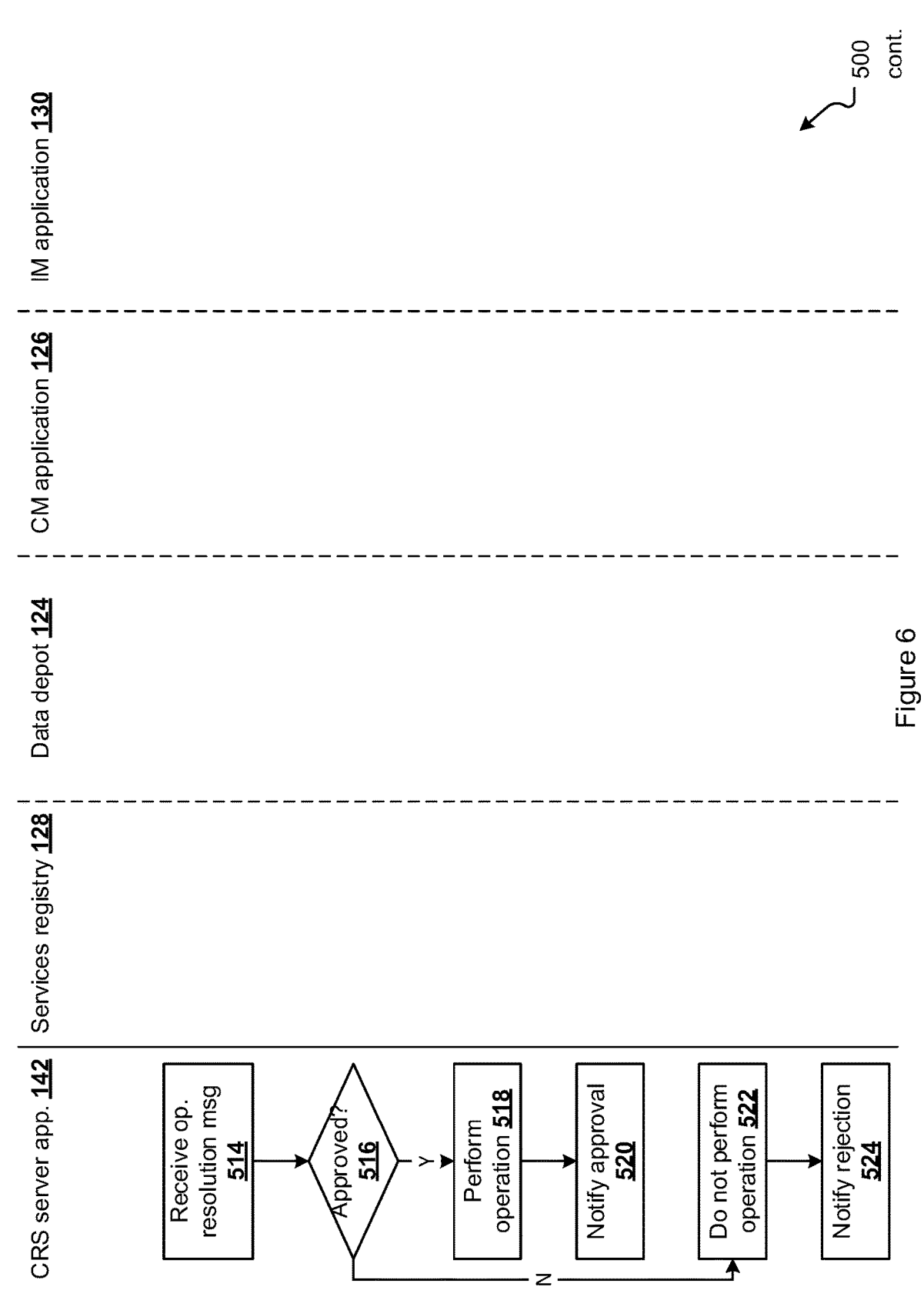

Turning to FIGS. 5 and 6, an operation approval process 500 will be described. Generally speaking, operation approval process 500 is performed for issues that are in respect of gated operations and that CM application 126 is monitoring. Such issues may be automatically created, for example according to process 300 described above or a similar process.

At 502, a given issue that is in respect of a gated operation is processed in accordance with its workflow.

A workflow for an issue type associated with a gated operation will have at least one pending workflow state (e.g. an initial state) and at least one operation resolution workflow state (i.e. a workflow state that is associated with an operation approval or operation rejection status). As described above, a workflow may include one or more operation approved workflow states (i.e. workflow states indicating that the operation the issue is associated with is approved) and/or one or more operation rejected workflow states (i.e. workflow states indicating that the operation the issue is associated with is rejected). A given workflow may also include one or more additional workflow states through which the issue can (or must, depending on the workflow) transition in order to progress from the initial state to a particular operation resolution workflow state.

As one example, a particular issue type (issue type 001) may be associated with a workflow that has a 'pending' state (the initial state of an issue of type 001), an 'under review' state, an 'approved' state, and a 'rejected' state. The 'approved' and 'rejected' workflow states may be operation resolutions states that are respectively associated with operation approval and rejection (e.g. in an operation resolution states data structure as described above). Furthermore, an automation rule may be created with: a trigger that is creation of an issue of type 001; a condition that is risk=low (i.e. that the risk determined for the operation associated with the issue is low); and an action that is transition to the 'approved' workflow state. In this case, if an issue of type 001 is created and it has a low risk, the automation triggers and causes the issue management application 130 to automatically transition the issue from the 'pending' workflow state to the 'approved' workflow state.

Continuing this example, a second automation rule may be created with: a trigger that is creation of an issue of the particular type (e.g. type 001); a condition that is risk=high (i.e. that the risk determined for the operation associated with the issue is low); a first action that is transition to the 'under review' workflow state; a second action that is generate and communicate a notification to a particular user or group of users (e.g. via email, instant message, display of a message in a user's application interface (the interface being generated by an ITS client application 114 running on a user device 110), and/or an alternative channel) that approval is required. In this case, if an issue of type 001 is created and it has a high risk, the automation triggers and causes the issue management application 130 to: automatically transition the issue from the 'pending' workflow state to the 'under review' workflow state; and automatically generate/send a notification to the defined user/user group. Following this, an appropriately permissioned user may, following review of the issue, manually transition the issue to the 'approved' workflow state (if the operation associated with the issue is approved) or to the 'rejected' workflow state (if the operation associated with the issue is rejected).

As will be appreciated, workflows with any desired states (and state transitions) can be defined for a given issue type, and any particular workflow state may be associated with an operation approval status or an operation rejected status. Furthermore any number of automation rules can be created to automatically transition an issue between states (and/or perform other actions) depending on conditions which are determined with reference to various parameters (issue risk being one such parameter).

Generally speaking, however, transition of an issue through a given workflow to an operation resolution workflow state may be entirely automatic: i.e. based entirely on a set of one or more automation rules which, provided conditions associated with those automation rule(s) are met, causes an issue to transition from its initial workflow state to an operation resolution workflow state (directly or via any other workflow states) without any manual input. Alternatively, transition of an issue through a workflow to an operation resolution workflow state may be entirely manual—e.g. in the case that no automation rules are defined (or, if defined, required conditions are not met). Further alternatively, transition of an issue through a workflow to an operation resolution workflow state may be partly automatic and partly manual.

In addition, while automatic transition to an approved state has been described it is also possible for a workflow to define an automatic transition to a rejected state. For example, a workflow may define that if one or more conditions are met while an issue is in a particular state (e.g. an initial 'pending' state or an alternative state) then the issue management application 130 automatically transitions the issue to a rejected state.

When an issue transitions to an operation resolution (or any other) workflow state, data in respect of the transition may be added to an appropriate issue field (e.g. a reasons or other field). Such a field may be used to record information/reasons as to why the operation to which the issue relates has been approved or rejected. For example, in the case of an issue that is automatically transitioned to an operation resolution workflow state, the automation rule causing the automatic transition may also result in the relevant issue field being populated with information indicating that the issue was transitioned to the approved/rejected state automatically (e.g. 'Issue automatically approved'/'Issue automatically rejected') and, optionally, information indicating any conditions that caused the automatic transition (e.g. 'Issue automatically approved due to low risk deployment to testing environment'/'Issue automatically rejected due to all project operations being temporarily suspended'). Where an issue is manually transitioned to an operation resolution workflow state, the user causing the transition may populate such a field with any reasons desired.

Accordingly, over the course of processing an issue at 502 one or more issue events 504 will occur. In the present example, each state transition of an issue (whether manual or automatic) is an issue event.

Each time an issue event associated with an issue the CM application 126 is monitoring (per 330 above) occurs, that event is detected by the CM application 126 at 506.

The CM application 126 can be configured to determine that an issue event has occurred in various ways. In the present embodiment, the issue management application 130 is configured to publish issue events on a publication/subscription service. The CM application 126 in turn subscribes to that service, watching for events that occur in respect of particular issues (i.e. those issues it has created). In this case, operation 330 described above involves the CM application 126 monitoring the publication/subscription service for any events associated with the issue ide received at 328. In this case, the publication/subscription service could be the same publication/subscription service used to publish creation of operation records (as described above with reference to 318) or an alternative publication/subscription service.

In alternative embodiments, the CM application 126 may determine that an issue event in respect of an issue it has created has occurred by periodically querying the issue management application 130 (requesting, for example, updates in respect of particular issue identifiers that the CM application 126 is monitoring). Further alternatively, the issue management application 130 may be configured to notify the CM application 126 directly when an issue event occurs in respect of an issue the CM application 126 caused creation of.

At 508, the CM application 126 determines whether the event is an operation resolution event: i.e. an event indicating that the issue (or the operation that the issue relates to) has been resolved by transitioning to a final state. In the present embodiment, this involves the CM application 126 determining if the event is in respect of a state transition from a pending workflow state to an operation resolution workflow state (i.e. a state associated with operation approval or operation rejection). As described above, operation resolution workflow states may be recorded in (and determined with reference to) an operation resolution states data structure.

If the event is not a resolution event (and therefore does not indicate that the issue has been approved or rejected) it is ignored by the CM application 126. The CM application 126 then continues to monitor/listen for further events with respect to the issue (and other issues the CM application 126 is monitoring).

If the event is a resolution event, processing continues to 510. At 510, the CM application 126 generates an operation resolution message and communicates this to the CRS server 142. The content of the operation resolution message will depend on the particular operation resolution workflow state that the issue has transitioned to, and whether that workflow state corresponds to operation approval or rejection. In response to determining that the operation resolution workflow state is an approved state, the operation resolution message is an operation approved message and includes data indicating that the operation is approved. In response to determining that the operation resolution workflow state is a rejected state, the operation resolution message is an operation rejection message and includes data indicating that the operation is rejected.

In certain embodiments, if any information is associated with the approval/rejection (e.g. in a 'reasons' or other issue field as described above), such information is included in the operation resolution message generated at 510.

The CM application 126 may communicate the operation resolution message to the CRS 140 in various ways, e.g. via an API call or other communication mechanism/channel.

Once the CM application 126 determines that a monitored issue has transitioned to an operation resolution workflow state it ceases monitoring that issue (at 512).

At 514 (FIG. 6), the CRS server 142 receives the operation resolution message generated by the CM application 126.

At 516, the CRS server 142 determines whether the operation resolution message is an operation approved message (in which case processing proceeds to 518) or an operation rejected message (in which case processing proceeds to 522).

At 518, the operation has been approved. In this case the CRS server 142 performs the operation as it normally would. For example, if the CRS 140 is a CI/CD system and the operation is a deployment operation, the CI/CD system proceeds to deploy the code base in question to the environment in question.

In certain embodiments, the CRS 140 is further configured to notify one or more users that the operation has been approved (and/or that the operation has been performed) at 520. Such notification may be performed by any appropriate mechanism, e.g. by the CRS server 142 causing the CRS client 114 to display an operation approved notification on a user device 110. Where available, an operation approved notification may be generated to include information as to why the operation was approved.

At 522, the operation has been rejected. In this case the CRS server 142 does not perform/aborts the operation. For example, if the CRS 140 is a CI/CD system and the operation is a deployment operation, the CI/CD system does not deploy the code base in question to the environment in question.

In certain embodiments, the CRS 140 is further configured to notify one or more users that the operation has been rejected at 524. Such notification may be performed by any appropriate mechanism, e.g. by the CRS server 142 causing the CRS client 114 to display an operation rejection notification on a user device 110. Where available, an operation rejection notification may be generated to include information as to why the operation was rejected.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
in response to a change requesting system receiving a user input at a user interface of the change requesting system to perform an operation and in response to the change requesting system determining that the operation is a gated operation and disabling a corresponding control of the operation, receiving, at a software instance of an issue tracking system instantiated over at least one processor, an operation notification from the change requesting system, the operation notification being in respect of the gated operation to be performed by the change requesting system;
in response to receiving the operation notification at the software instance of the issue tracking system:
determining an operation classification based on one or more parameters of the operation notification;
identifying an issue managed by the issue tracking system and corresponding to the operation of the operation notification, the issue associated with a predefined workflow of multiple workflow states defined by the issue tracking system, the multiple workflow states including at least one pending workflow state and at least one operation resolution workflow state;
computing a risk value for the identified issue based on the operation classification and one or more first attributes of the identified issue managed by the issue tracking system; and
retrieving an automation rule based on one or more second attributes of the identified issue and evaluating the automation rule with respect to one or more conditions of the issue tracking system and the computed risk value, the automation rule causing the issue tracking system to automatically transition the issue from a first workflow state to a second workflow state; and automatically communicating a message regarding the workflow state transition from the issue tracking system to the change requesting system, thereby causing the change requesting system to reenable the corresponding control of the operation in the user interface of the change requesting system.

2. The computer-implemented method of claim 1, wherein:

identifying the issue includes determining an issue type that corresponds to the gated operation; and creating the issue having the issue type.

3. The computer-implemented method of claim 1, wherein in response to the second workflow state corresponding to a resolution workflow state, the message regarding the workflow state transition includes an indication that the issue has been resolved.

4. The computer-implemented method of claim 1, wherein:

the second workflow state is an operation approved state;

the message is an operation approved message; and communicating the operation approved message to the change requesting system causes the change requesting system to perform the gated operation.

5. The computer-implemented method of claim 1, wherein:

the second workflow state is an operation rejected state;

the message is an operation rejected message; and communicating the operation rejected message to the change requesting system prevents the change requesting system from performing the gated operation.

6. The computer-implemented method of claim 1, further comprising:

associating the computed risk value with the issue.

7. The computer-implemented method of claim 6, wherein computing the risk value associated with the gated operation comprises:

determining a first service, the first service being a service that the gated operation relates to, the first service having a first service criticality measure; and determining the risk value based at least in part on the first service criticality measure.

8. The computer-implemented method of claim 7, wherein computing the risk value associated with the gated operation further comprises:

determining a second service with which the first service has a dependency relationship the second service having a second service criticality measure; and determining the risk value based on the second service criticality measure.

9. A system comprising:

one or more processing units; and a computer-readable storage medium storing instructions, which when executed by the one or more processing units, cause the system to:

in response to a change requesting system receiving a user input at a user interface of the change requesting system to perform an operation and in response to the change requesting system determining that the operation is a gated operation and disabling a corresponding control of the operation, receive, at a software instance of an issue tracking system instantiated over the one or more processing units, an operation notification from the change requesting system, the operation notification being in respect of the gated operation to be performed by the change requesting system;

in response to receiving the operation notification at the software instance of the issue tracking system:

determine an operation classification based on one or more parameters of the operation notification;

identify an issue managed by the issue tracking system and corresponding to the operation of the operation notification, the issue associated with a predefined workflow of multiple workflow states defined by the issue tracking system, the multiple workflow states including at least one pending workflow state and at least one operation resolution workflow state;

compute a risk value for the identified issue based on the operation classification and one or more first attributes of the identified issue managed by the issue tracking system; and retrieve an automation rule based on one or more second attributes of the identified issue and evaluate the automation rule with respect to one or more conditions of the issue tracking system and the computed risk value, the automation rule causing the issue tracking system to automatically transition the issue from a first workflow state to a second workflow state; and in accordance with a determination that the issue has been transitioned to a particular operation resolution workflow state, automatically communicate an operation resolution message from the issue tracking system to the change requesting system, thereby causing the change requesting system to reenable the corresponding control of the operation in the user interface of the change requesting system.

10. The system of claim 9, wherein the system is further configured to identify the issue by:

determining an issue type that corresponds to the gated operation; and creating the issue having the issue type.

11. The system of claim 9, wherein the evaluation that the automation rule satisfies the one or more conditions corresponds to a determination that the gated operation corresponds to code deployment to a testing deployment environment.

12. The system of claim 9, wherein the automation rule fails to satisfy the one or more conditions if the gated operation corresponds to code deployment to a production deployment environment.

13. The system of claim 9, wherein:

the computed risk value is based at least in part on a first risk factor and a second risk factor;

the gated operation corresponds to an operation to deploy source code to a software service;

the first risk factor is based at least in part on a service criticality level of the software service; and the second risk factor is based at least in part on a deployment environment in which the source code is to be deployed.

14. The system according to claim 13, wherein:

the particular operation resolution workflow state is an operation approved state;

the operation resolution message is an operation approved message; and communicating the operation approved message to the change requesting system causes the change requesting system to perform the gated operation.

15. A computer-implemented method, comprising:

in response to a change requesting system receiving a user input at a user interface of the change requesting system to perform an operation and in response to the change requesting system determining that the operation is a gated operation and disabling a corresponding control of the operation, receiving, at a software instance of an issue tracking system instantiated over at least one processor, a notification being in respect of the gated operation to be performed by the change requesting system;

in response to receiving the notification at the software instance of the issue tracking system:
  determine an operation classification based on one or more parameters of the notification;
  determine an issue type associated with the gated operation, the issue type associated with a predefined workflow of multiple workflow states defined by the issue tracking system, the multiple workflow states including at least one pending workflow state and at least one operation resolution workflow state;
  automatically create an issue of the determined issue type in the issue tracking system;
  compute a risk value for the created issue based on the operation classification and one or more first attributes of the created issue; and
  retrieve an automation rule based on one or more second attributes of the created issue and evaluate the automation rule with respect to one or more conditions of the issue tracking system and the computed risk value, the automation rule causing the issue tracking system to automatically transition the created issue from a first workflow state to a second workflow state; and
  in accordance with a determination that the issue has been transitioned to a particular operation resolution workflow state, automatically communicate an operation resolution message from the issue tracking system to the change requesting system, thereby causing the change requesting system to reenable the corresponding control of the operation in the user interface of the change requesting system.

16. The computer-implemented method of claim 15, wherein:

the particular operation resolution workflow state is an operation rejected state;

the operation resolution message is an operation rejected message; and communicating the operation rejected message to the change requesting system prevents the change requesting system from performing the gated operation.

17. The computer-implemented method according to claim 15, further comprising associating the computed risk value with the issue, wherein computing the risk value associated with the gated operation comprises:
  determining a first service, the first service being a service that the gated operation relates to, the first service having a first service criticality measure; and
  determining the risk value based at least in part on the first service criticality measure.

18. The computer-implemented method of claim 17, wherein computing the risk value associated with the gated operation further comprises:
  determining a second service with which the first service has a dependency relationship, the second service having a second service criticality measure; and
  determining the risk value based on the second service criticality measure.

19. The computer-implemented method of claim 15, wherein the predefined workflow defines a manual state transition to the particular operation resolution workflow state and the method further comprises:
  generating an approval request;
  causing the approval request to be communicated to a user device;
  receiving an approval response from the user device, the approval response indicating approval; and
  in response to receiving the approval response, transitioning the issue to the particular operation resolution workflow state.

20. The computer-implemented method of claim 15, wherein determining that the issue has been transitioned to the particular operation resolution workflow state comprises:
  subscribing to a publication/subscription service to which issue events are published;
  receiving a notification that an issue event in respect of the issue has been published on the publication/subscription service; and
  determining that the published issue event corresponds to a transition to the particular operation resolution workflow state.

* * * * *